United States Patent [19]
Lee

[11] Patent Number: 5,499,377
[45] Date of Patent: Mar. 12, 1996

[54] MULTI-COMPUTER ACCESS SWITCHING SYSTEM

[75] Inventor: Won S. Lee, Laguna Hills, Calif.

[73] Assignee: Designed Enclosures, Inc., Escondido, Calif.

[21] Appl. No.: 57,007

[22] Filed: May 3, 1993

[51] Int. Cl.⁶ .................................................. G06F 13/00
[52] U.S. Cl. ................ 395/200.01; 370/54; 340/825.03; 364/241.9; 364/242.94; 364/DIG. 1
[58] Field of Search ...................................... 395/800, 725, 395/650, 325, 275, 200; 371/8.2, 9.1, 11.1–11.3; 370/53, 54, 60, 62, 67, 85.1, 85.7, 92, 94.1, 94.3, 95.1; 340/825, 825.03, 826, 827, 825.06, 825.07

[56] References Cited

U.S. PATENT DOCUMENTS

| | | | |
|---|---|---|---|
| 4,730,251 | 3/1988 | Aakre et al. | 395/325 |
| 5,166,674 | 11/1992 | Baum et al. | 340/825.07 |
| 5,317,695 | 5/1994 | Cuenod et al. | 395/275 |

*Primary Examiner*—Alyssa H. Bowler
*Assistant Examiner*—Alpesh M. Shah
*Attorney, Agent, or Firm*—Nilsson, Wurst & Green

[57] ABSTRACT

A switching system is provided to enable selective access from a work center W to any of a plurality of computers PC1–PC 16. Connections are provided from the work center W including a video monitor, a keyboard and a mouse through a selector S proximate the work center W and a single cable bus CB extending in parallel to a plurality of controllers C1–C4 proximate individual computers. The selector S associates a specific computer with identification signals that are provided through the cable bus CB to the controllers C1–C4 to selectively link the identified computer through one of the controllers C1–C4 and the selector S to the work center W. The selector S incorporates a display to identify the selected computer and a manual switch for computer selection. Signal adjustment, reset and autobooting capabilities are provided in the system.

7 Claims, 2 Drawing Sheets

MULTI-COMPUTER ACCESS SWITCHING SYSTEM

FIELD OF THE INVENTION

This invention relates to computers and more specifically to a communications network for selectively linking individual computers to a control console.

BACKGROUND OF THE INVENTION

One popular configuration of computerization involves multiple individual computers (personal computers, file servers and so on) interconnected in a local area network (LAN). A typical network would involve several individual computers that may be located in groups. For example, a system might involve a few computers at each of several separate locations. In relation to such installations, a need has been recognized for a switch or communications link from a single control console, work center or operation center to operate any selected computer or server in the network. Specifically, a need has existed for a single work center, for example embodying a video monitor, a keyboard and a mouse, capable of communication with select computers in a network.

Of course, mechanical switches have been employed for accomplishing selective communication between a work center and any of a plurality of computers. More effective communication also has been accomplished using electronic switches along with various features as automatic booting and video signal refinement.

One prior form of switching system utilizes a work center or console work center with individual cables extending to each of the several computers. By actuating the console, selective communication can be established through one of the cables for a selected computer. Although such systems have been effective, the volume of cable often is troublesome and difficult to accommodate. For example, numerous cables extending from multiple individual computers to the console frequently present a substantial problem. Accordingly, a need exists for a local area network computer switching system enabling access from a single work center (video monitor, keyboard and mouse) to any of a plurality of computers, e.g., personal computers, file servers and so on. Considerations with respect to such a system involve economy, ease of installation, convenience of use and durability.

SUMMARY OF THE INVENTION

In general, the system of the present invention allows a single keyboard, monitor and mouse to directly access several separate computers. The system involves a single selector device (located with the work center) along with one or more controller units located and connected to individual computers. A single bus may be employed to connect the selector to a plurality of the controllers, each of which is in turn connected to one or more computers. For example, from a work center, a selector communicates through a single cable bus to several controllers in parallel. Specifically, four controllers might be located at four distinctive locations, each for serving a small group of computers, e.g., four computers. Accordingly, by activating the selector, any computer attached to any controller can be selected to interface the work center.

BRIEF DESCRIPTION OF THE DRAWINGS

The invention may be embodied utilizing various structures and techniques; however, a specific embodiment will now be described by way of example and with reference to the accompanying drawings, in which.

DETAILED DESCRIPTION OF THE DISCLOSED EMBODIMENT

Figure 1:
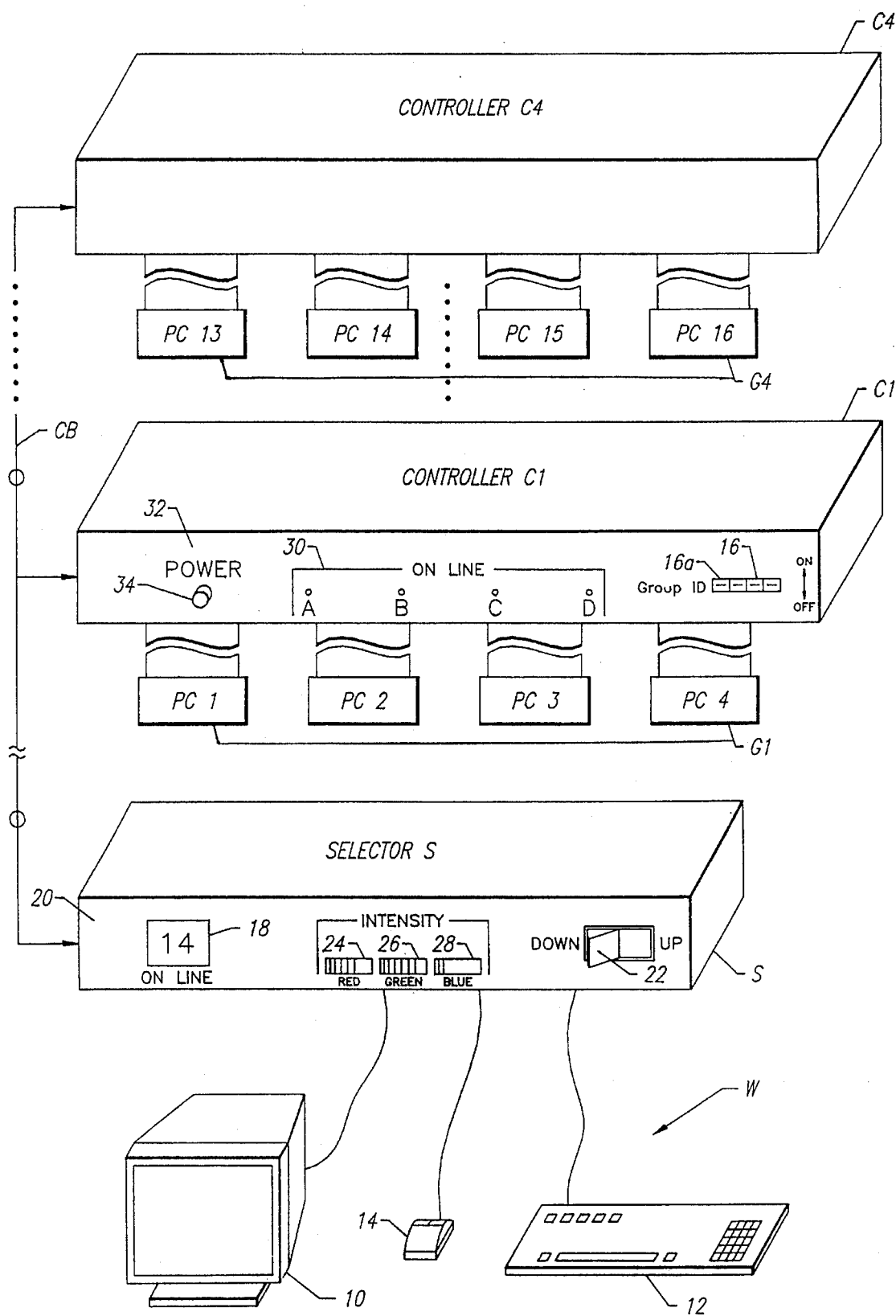
FIG. 1 is a partially perspective diagram illustrating a system in accordance with the present invention.

A work center W is generally illustrated in FIG. 1 (bottom) including a video monitor 10, a keyboard 12 and a mouse 14. Also, FIG. 1 indicates a plurality of personal computers PC1–PC16, only eight of which are illustrated. Specifically, two computer groups G1 (computers PC1–PC4) and G4 (computers PC13–PC16) are illustrated, however, groups G2 and G3 are deemed to exist in the system including computers PC5–PC12.

Generally, the system of the present invention involves switching operations to selectively place the work center W in communication with any of the personal computers PC1–PC16. Accordingly, from the work center W, communication can be established with any of the personal computers PC1–PC16. Note that the personal computers PC1–PC16 may take various forms including file servers and so on.

The elements of the work center W are connected to a selector S while the groups G1–G4 of personal computers are connected respectively to four controllers, the controllers C1 and C4 being illustrated as representative. That is, although only the controllers C1 and C4 are illustrated, it is to be understood that the system would incorporate controllers C2 and C3 which have been eliminated in the interest of avoiding undue complication of the drawing. The selector S is connected to each of the controllers C1–C4 through single cable bus CB. That is, the connection from the selector S is essentially through the cable bus CB to each of the controllers C1–C4 in parallel.

Each group G1–G4 of computers is connected to one of the controllers C1–C4, respectively. Specifically, the personal computers, PC1, PC2, PC3 and PC4 (group G1) are connected to the controller C1. The computers PC5, PC6, PC7 and PC8 (not shown) would be connected to controllers C2 (not shown). The format would be similar for each of the controllers, recognizing that a controller may accommodate from one to four personal computers. Thus, the controller C4 is coupled to the personal computers PC13, PC14, PC15 and PC16 (group G4).

It is important to recognize that the selector S is positioned proximate to the work center W while each of the controllers is positioned proximate to the computers in an associated group. Specifically, for example, the controller C1 is located in the area of the group G1 of computers.

As disclosed in detail below, communication between the computers PC1–PC16 and the work center W is facilitated through the single cable bus CB so that a multitude of individual cables are avoided at the location of the work center W. That is, a single cable bus CB extends from the selector S branching to the controllers C1–C4. In that regard, while the system of FIG. 1 is represented to accommodate sixteen personal computers PC1–PC16, the number can be extended by the utilization of AB switches as disclosed below.

Considering the system of FIG. 1 in greater detail, as explained, the controller C1 is coupled to the personal computers PC1, PC2, PC3 and PC4. Specifically, each of the computers PC1–PC4 is connected to the controller C1 by cables to carry: (1) video signals; (2) keyboard signals; and (3) mouse signals. Note that the cable bus CB incorporates several signal paths, e.g., 25 wires. In that regard, different sets of wires or signal paths are assigned to carry different sets of signals, specifically including: video signals, mouse signals, and clock and data keyboard signals, all of which are described in detail below.

Although the controllers C1–C4 are similar, only the control panel 32 of the controller C1 is shown in detail as representative. Each of the controllers C1–C4 includes a set of four dip switches 16 serving to identify as active one of the groups G1, G2, G3 or G4. Setting the first dip switch 16a of the controller C1 to an "on" position indicates that it serves the computers of group G1, i.e., computers PC1, PC2, PC3 and PC4. Although the control panels of the other controllers C2–C4 are not illustrated, it is to be understood that generally, to serve the second group G2, the second dip switch 16b (not shown) is set "on" to indicate it serves computers PC5, PC6, PC7 and PC8. Similar settings accommodate the controllers C3 and C4 to the groups C3 and G4, respectively.

With the dip switches determining served computer groups, the active computers PC1–PC16 are identified by an LED display 18 on the front panel 20 of the selector S. Specifically, the numeral "14" of the display 18 indicates the active one of the computers PC1–PC16. The panel 20 also carries a rocker switch 22 serving to select the specific one of the personal computers PC1–PC16 to interface with the work center W. Three intensity adjustment dials 24, 26 and 28 on the panel 20 accommodate for the color components red, green and blue, respectively, in the video monitor display.

In the operation of the system as illustrated in FIG. 1, the user simply actuates the rocker switch 22 to increment or decrement the number of the display 18, thereby designating the active computer PC1–PC16. As illustrated, the number "14" indicates that the personal computer PC14 is interfaced with the work center W. Consequently, the monitor 10, the keyboard 12 and the mouse 14 are connected in a cooperative relationship with the personal computer PC14. The rocker switch 16 may be touched on either side to respectively increment or decrement the displayed selection.

With the selection of a particular personal computer PC1–PC16, e.g., computer PC14, the user may elect to adjust the intensity of the color components "red", "green" or "blue" as manifest by the display of the monitor 10. Accordingly, the dials 24, 26 and 28, respectively, may be actuated to obtain the desired color combination.

In the operation of the selector S to activate a certain controller C1–C4 for engaging control of a specific one of the personal computers PC1–PC16, binary codes are provided to identify the personal computers PC1–PC16. As indicated above, each of the controllers C1–C4 accommodates four personal computers, the numerical sequence being determined by the four dip switches 16. Specifically, for the disclosed embodiment, the association is summarized in the following chart. The individual controllers C1–C4 appear in the first column, the activated dip switch (1–4) is in the second column, the controlled personal computers (PC1–PC16) are shown in the third column and the selection codes appear in the fourth column.

CHART 1

| Controller | Dip Switch | PC | Selection Code |
|---|---|---|---|
| C1 | 1 | PC1 | 0000 |
|  | — | PC2 | 0001 |
|  | — | PC3 | 0010 |
|  | — | PC4 | 0011 |
| C2 | 2 | PC5 | 0100 |
|  | — | PC6 | 0101 |
|  | — | PC7 | 0110 |
|  | — | PC8 | 0111 |
| C3 | 3 | PC9 | 1000 |
|  | — | PC10 | 1001 |
|  | — | PC11 | 1010 |
|  | — | PC12 | 1011 |
| C4 | 4 | PC13 | 1100 |
|  | — | PC14 | 1101 |
|  | — | PC15 | 1110 |
|  | — | PC16 | 1111 |

Note that in addition to the display 18 (FIG. 1) of the selector S, the controllers C1–C4 also collectively indicate the currently active personal computer. The indication is by a series of four "online" lamps, "A", "B", "C" and "D", illustrated on the front panel 32 of the controller C3. These letters correlate to the computer numerical designations, e.g., lamp "A" at controller C1 designates computer PC1, at controller C2, it designates computer PC5, at controller C3, it designates computer PC9 and so on. Note also that the panel 32 of the controller C1 carries a power lamp 34 along with the dip switches 16 as considered above.

Figure 2:
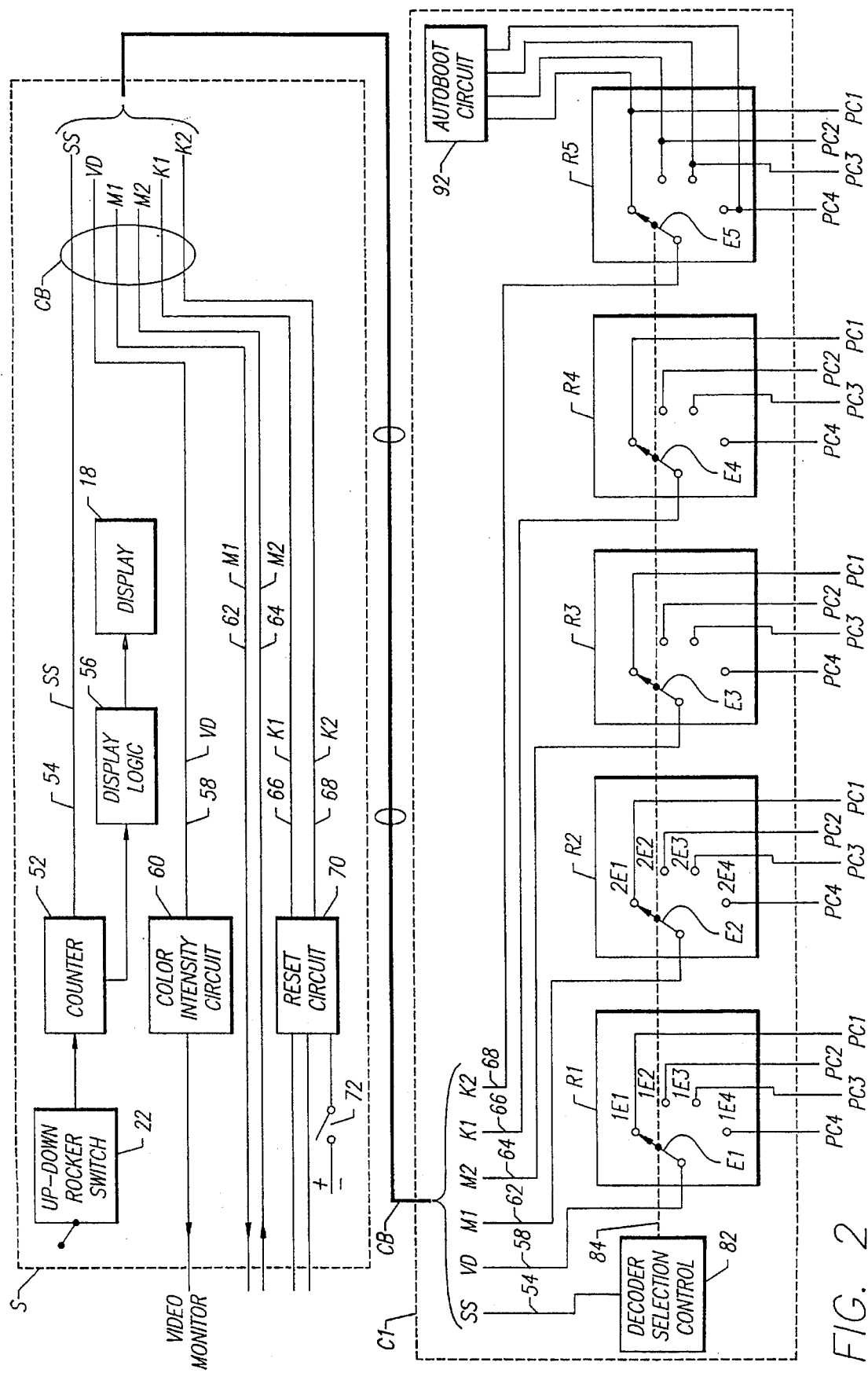
FIG. 2 is a block diagram showing the system of FIG. 1 in greater detail.

Turning now to FIG. 2, an exemplary detailed configuration of the system of FIG. 1 will be treated. In that regard, the rocker switch 22 is illustrated in block form (FIG. 2, upper left) shown coupled to a counter 52 that drives the display 18 (FIG. 1) of the selector S. As illustrated in FIG. 2, the counter 52 has a capacity of sixteen and provides the binary count signals SS in four signal paths represented by the cable 54. As explained above, the signals SS in the cable 54 manifest the selection code for identifying the personal computer (PC1–PC16) that currently is active. The signals SS also are applied to display logic 56 serving to drive the display 18. Accordingly, the display 18 reflects the state of the counter 52 and thereby indicates the specific personal computer (PC1–PC16) selected to interface the work center W.

In addition to the selection signals SS provided from the selector S, the cable bus CB also accommodates the work center-PC signals. Specifically, for the video monitor 10 (FIG. 1), a video signal VD is provided through a cable 58 (multiple conductor paths). Connected in the cable 58, a color intensity circuit 60 accommodates the control of the intensity adjustment dials 24, 26, and 28 (FIG. 1). That is, the adjustment dials simply enable adjustment of the circuit 60 to attain the desired color intensity levels.

Two cables 62 and 64 (two conductors) are provided for mouse signals M1 (mouse TXD) and M2 (mouse RXD). A pair of keyboard signals K1 and K2 (data and clock) are accommodated in cables 66 and 68, respectively, that pass through a reset circuit 70. A switch 72 activates the reset circuit 70. The switch 72 is mounted at the rear of the selector S (not shown in FIG. 1) along with connection terminals (not shown).

The cables 54, 58, 62, 64, 66 and 68 are indicated collectively as the cable bus CB (FIG. 2, upper right). Extending from the selector S to the controller C1, the cable bus CB is illustrated as a single heavy line. The individual cables of the cable bus CB again are indicated separately within the controller C1 (FIG. 2, left central). Note that as disclosed above, the cable bus CB extends to each controller in parallel.

Within the controller C1, the cable 54 provides the signal SS, received by a decoder selection control 82. In operation, the decoder selection control 82 actuates five switches, a switch for each of the separate cables, to selectively couple the personal computers.

To simplify the explanation, and as well recognized in the art, the switching system driven by the controller 82 is illustrated and described as a mechanical analogy of the actual electronic logic. Specifically, the control 82 is illustrated to actuate multiple contact, rotary switches R1–R5. The switches essentially are similar; however, as indicated above, the cables 58, 62, 64, 66 and 68 include different numbers of individual paths or conductors. In that regard, each of the cables carries a set of signals as explained above, and the switches R1–R5 simply operate to switch all of the conductors in each of the cables.

As illustrated in FIG. 2, a mechanical connection represented by a dashed line 84 couples the decoder control 82 to each of a series of movable contacts E1–E5 in the rotary switches R1–R5, respectively. Accordingly, the control 82 mechanically actuates the contacts E1–E5 to selectively engage one of four stationary contacts as representatively labelled in the switches R1 and R2. In the switch R1, the contacts are designated 1E1–1E4. Following the pattern, for the switches R2–R5, the contacts would be designated respectively, 2E1–2E4, 3E1–3E4, 4E1–4E4 and 5E1–SE4. For example, the switch R1 carrying the video signals VD contains four rotary contacts 1E1, 1E2, 1E3 and 1E4 that respectively are connected to the personal computers PC1, PC2, PC3 and PC4. Similarly, the switch R2 includes stationary contacts 2E1, 2E2, 2E3 and 2E4, respectively connected to carry the mouse signals M1 to the computers PC1, PC2, PC3 an PC4. The switches R3, R4 and R5 are similarly connected to carry the signals M2, K1 and K2, selectively to the personal computers PC1–PC4.

The decoder selection control 82 receives the selection signal SS in the form of four parallel bits indicated as the selection code in the above chart. Also, as indicated in the above chart, depending on the selection code, each of the switches R1–R5 is set to communicate with one of the personal computers PC1–PC4. For example, in the disclosed system, providing a selection signal SS to the control 82, manifesting a selection code 0001, actuates the movable contacts E1–E5 to engage the stationary contacts 1E2, 2E2, 3E2, 4E2 and 5E2. Accordingly, connections may be established to the personal computer PC2 for each of the work center signals. Thus, the system allows the signal monitor 10 (FIG. 1), mouse 14 and keyboard 12 to directly access any of the four computers PC1–PC4 through the selector S and the controller unit C1.

As explained above, the system as illustrated in FIG. 2 may be expanded to accommodate sixteen computers by utilizing four controllers C1–C4. The system further can be expanded to accommodate up to thirty-two or forty-eight computers, by utilizing an AB or ABC switch, as well known in the art. Also as explained above, the controllers C1–C4 can be variously located and, in that regard, the cable bus CB might encompass a length of several hundred feet.

For a user, the operation is simple and convenient. From the selector S (FIG. 1), the user simply actuates the rocker switch 22 to access any one of the connected computers PC1–PC16, as indicated by the display 18. The selector S is essentially transparent to differing keyboard characteristic sets to allow any combination of PC, PC/AT, PS2 or any compatible computer to be connected to the system. Rapidly, the selected computer is accessible to the user, for example, a network manager, using the single monitor 10, keyboard 12 and mouse 14.

It will be apparent that the system hereof significantly simplifies various operations as related to LAN, CAD/CAM, desktop publishing or other multiple computer applications. The system eliminates unnecessary input/output and communication hardware. Furthermore, it reduces the required equipment space while increasing convenience of operation and productivity. Through the use of the single cable bus CB, the system eliminates the large number of burdensome and unsightly cables typically associated with systems of the prior art.

Upon initial energization, many computers execute a preparatory "booting" operation. Typically, the booting operation of a personal computer includes a test to verify the presence of a keyboard. In implementations of the system of the present invention, only one of the sixteen computers PC1–PC16 is connected to a keyboard. As a consequence, following a power failure, the unconnected computers may not complete the booting operation.

To avoid such booting failure, the system of the present invention incorporates an automatic booting circuit 92 (FIG. 2) coupled to the switch R5. Autoboot circuits satisfactory for use as the circuit 92 are well known in the prior art, functioning simply to manifest the presence of a keyboard in response to inquiry signals. Note that the autoboot circuit 92 is connected to each of the personal computers PC1–PC4, thereby providing full time access to enable the booting operation. Consequently, each of the personal computers may independently boot up upon initial power up or immediately following a power interruption.

In view of the above explanation, it will be apparent that the disclosed system affords effective, convenient and economical operation in accessing multiple computers from a single location utilizing a single work center. Although various modifications and substitutions to the system will become readily apparent, it is to be understood that the scope hereof is to be determined in accordance with the claims set forth below.

What is claimed is:

1. A multi-computer access switching system for accessing a plurality of computers from a single work center, said work center including input/out devices, said plurality of computers located at distinct physical locations substantially remote from said work center, said system comprising:

a selector unit, including a designator to provide computer identification signals for selective communication between said work center and a selected one of said plurality of computers, said selector unit located at or near said work center and connected to said input/out devices of said work center;

at least one controller unit, including switch elements for selectively connecting said selected one of said computers to said work center as indicated by said computer identification signals and located proximate said plurality of computers and connected to said computers; and a cable bus coupling said selector unit to said at least one controller unit to enable said work center to be selectively connected to one of said plurality of computers through said switch elements in accordance with said computer identification signals and to enable said selective communication between said work center and said selected computer through said same cable bus; wherein said designator in said selector unit includes a counter and a counter switch for actuating said counter to selectively identify said computers and provide said computer identification signals representative thereof and wherein said cable bus includes a plurality of signal paths to carry said computer identification signals.

2. A switching system according to claim 1 wherein said designator in said selector unit includes a counter and a counter switch for actuating said counter to selectively identify said computers and provide said computer identification signals representative thereof.

3. A switching system according to claim 1 wherein said selector unit further includes a display to indicate said computer identification signals.

4. A switching system according to claim 1 wherein said selector unit further includes a keyboard reset unit.

5. A switching system according to claim 1 wherein said selector unit includes an intensity control for adjusting signal levels from said computers to said work center.

6. A switching system according to claim 1 wherein said selector unit includes coupling means for said work center including a monitor, a keyboard and mouse means and said switching elements of said controller include means for switching signals of said monitor, said keyboard and said mouse means.

7. A switching system according to claim 1 wherein said controller includes autoboot means for indicating the presence of a keyboard.

* * * * *